US012641552B2

(12) United States Patent
Mandelli et al.

(10) Patent No.: US 12,641,552 B2
(45) Date of Patent: May 26, 2026

(54) DETERMINING TRANSMIT POWER PER BEAM PAIR

(71) Applicant: Nokia Solutions and Networks Oy, Espoo (FI)

(72) Inventors: Silvio Mandelli, Ludwigsburg (DE); Maximilian Arnold, Murrhardt (DE)

(73) Assignee: Nokia Solutions and Networks Oy, Espoo (FI)

( * ) Notice: Subject to any disclaimer, the term of this patent is extended or adjusted under 35 U.S.C. 154(b) by 595 days.

(21) Appl. No.: 18/112,555

(22) Filed: Feb. 22, 2023

(65) Prior Publication Data

US 2023/0269676 A1     Aug. 24, 2023

(30) Foreign Application Priority Data

Feb. 23, 2022    (FI) ...................................... 20225163

(51) Int. Cl.
| | |
|---|---|
| *H04W 52/36* | (2009.01) |
| *H04W 52/02* | (2009.01) |
| *H04W 52/42* | (2009.01) |

(52) U.S. Cl.
CPC ..... *H04W 52/367* (2013.01); *H04W 52/0245* (2013.01); *H04W 52/42* (2013.01)

(58) Field of Classification Search
CPC ........... H04W 52/367; H04W 52/0245; H04W 52/42
See application file for complete search history.

(56) References Cited

U.S. PATENT DOCUMENTS

| | | |
|---|---|---|
| 9,912,374 B2 | 3/2018 | Zhang |
| 2013/0114468 A1 | 5/2013 | Hui et al. ...................... 370/277 |
| 2013/0142222 A1 | 6/2013 | Wang et al. ................... 375/211 |
| 2013/0194984 A1 | 8/2013 | Cheng et al. |
| 2015/0341157 A1 | 11/2015 | Eltawil et al. |
| 2016/0295596 A1 | 10/2016 | Masmoudi et al. |
| 2020/0358500 A1* | 11/2020 | Ryu ..................... H04B 7/0695 |
| 2021/0105725 A1 | 4/2021 | Karjalainen et al. |
| 2023/0111603 A1* | 4/2023 | Ghimire ................ G01S 5/0036 455/456.1 |

FOREIGN PATENT DOCUMENTS

| | | |
|---|---|---|
| CN | 109644013 A | 4/2019 |
| CN | 112335185 A | 2/2021 |

(Continued)

OTHER PUBLICATIONS

Nwankwo, Chinaemerem David, et al., "A Survey of Self-Interference Management Techniques for Single Frequency Full Duplex Systems", IEEE Access, vol. 6, Jun. 2018, pp. 30242-30268.

(Continued)

*Primary Examiner* — Elton Williams

(74) *Attorney, Agent, or Firm* — McCarter & English, LLP

(57)     ABSTRACT

Disclosed is a method including determining, per transmit and receive beam pair of a plurality of beam pairs, a transmit power value based at least partly on a saturation power value of one or more analog-to-digital converters at a receiver; and transmitting, via a transmitter, a signal using the determined transmit power value and a corresponding transmit beam per transmit and receive beam pair of the plurality of beam pairs.

20 Claims, 7 Drawing Sheets

(56)         References Cited

FOREIGN PATENT DOCUMENTS

| CN | 113746615 A | 12/2021 |
| EP | 1 887 380 A1 | 2/2008 |
| WO | WO 2011/148341 A1 | 12/2011 |
| WO | WO-2021/230389 A1 | 11/2021 |
| WO | WO 2022/008063 A1 | 1/2022 |

OTHER PUBLICATIONS

CN Office Action, Application No. 202310157527.4 dated Sep. 11, 2025.

* cited by examiner

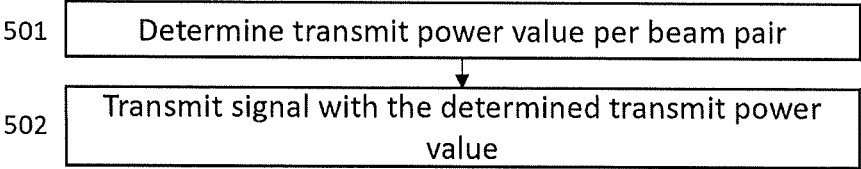

501  Determine transmit power value per beam pair

502  Transmit signal with the determined transmit power value

FIG. 5

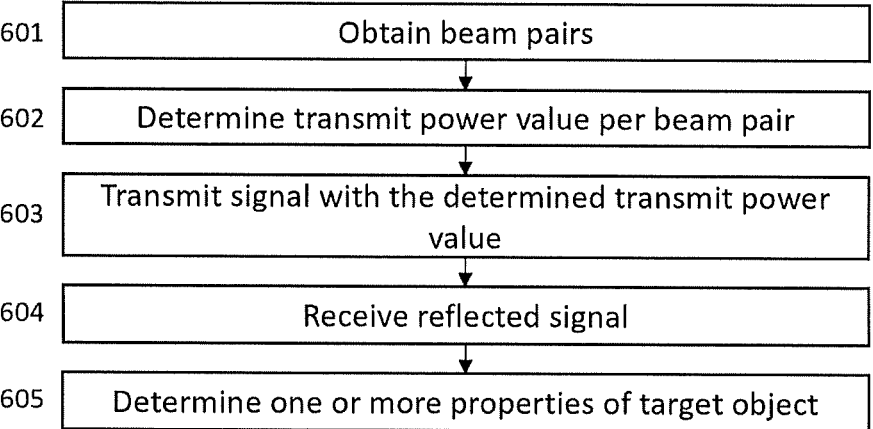

601  Obtain beam pairs

602  Determine transmit power value per beam pair

603  Transmit signal with the determined transmit power value

604  Receive reflected signal

605  Determine one or more properties of target object

FIG. 6

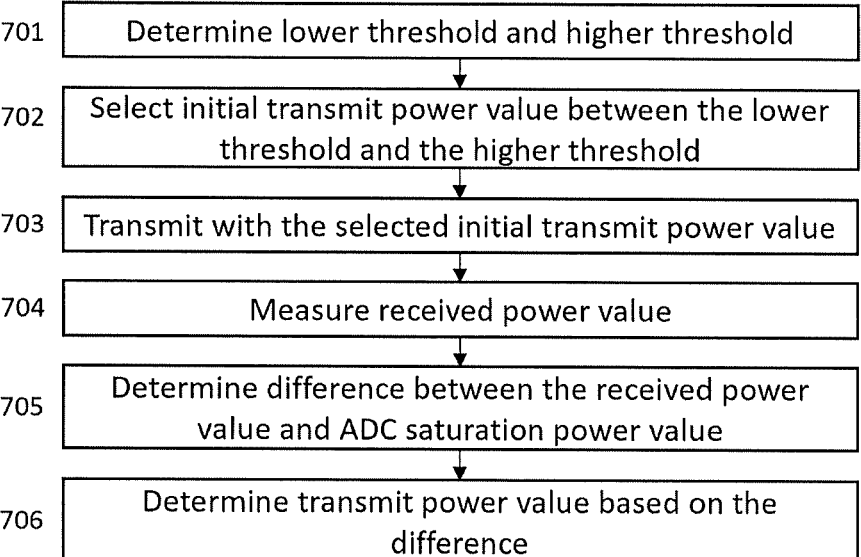

701  Determine lower threshold and higher threshold

702  Select initial transmit power value between the lower threshold and the higher threshold 703  Transmit with the selected initial transmit power value 704  Measure received power value 705  Determine difference between the received power value and ADC saturation power value 706  Determine transmit power value based on the difference

FIG. 7

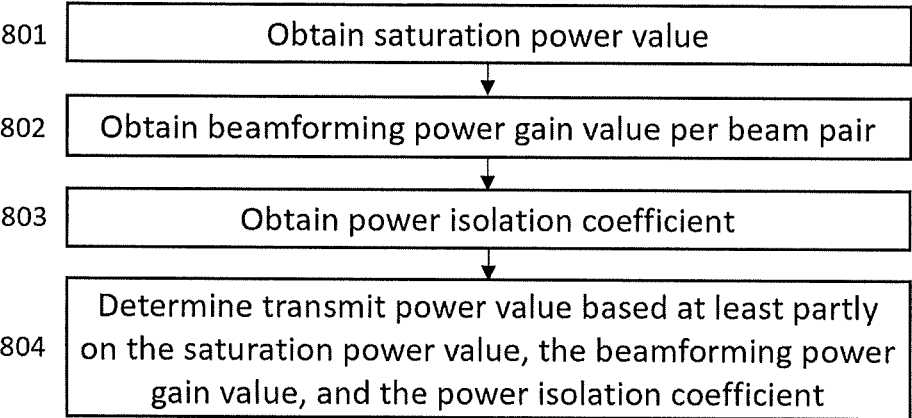

801    Obtain saturation power value

802    Obtain beamforming power gain value per beam pair

803    Obtain power isolation coefficient

804    Determine transmit power value based at least partly on the saturation power value, the beamforming power gain value, and the power isolation coefficient

FIG. 8

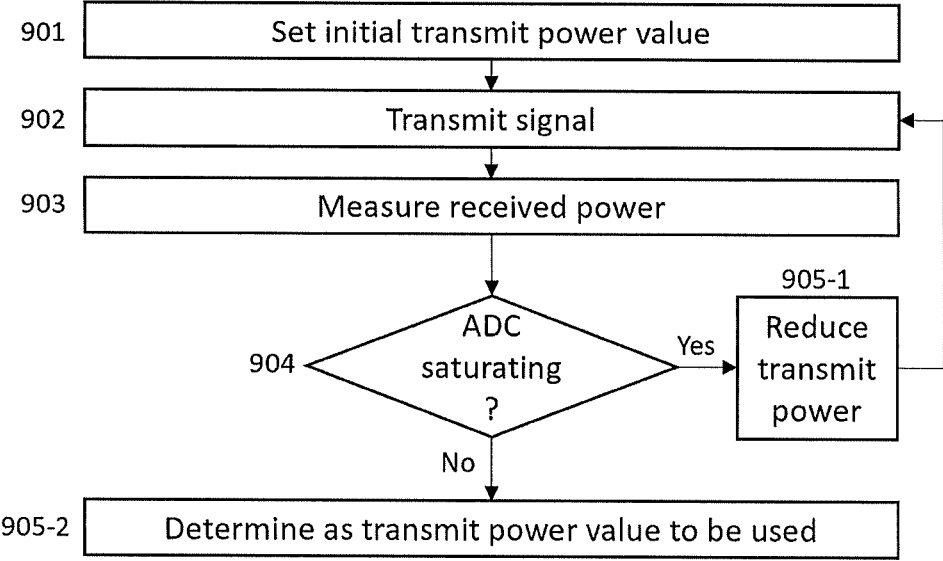

901    Set initial transmit power value

902    Transmit signal

903    Measure received power

904    ADC saturating?

Yes 905-1    Reduce transmit power

No 905-2    Determine as transmit power value to be used

FIG. 9

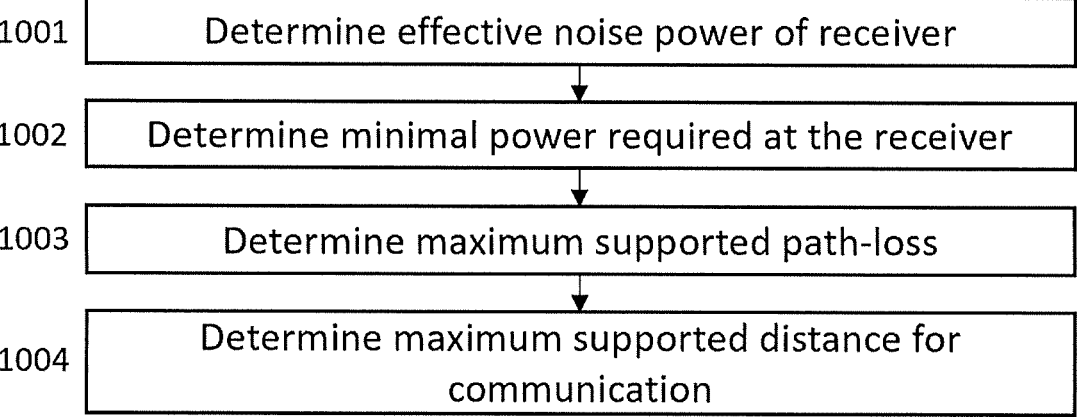

1001 Determine effective noise power of receiver

1002 Determine minimal power required at the receiver

1003 Determine maximum supported path-loss

1004 Determine maximum supported distance for communication

FIG. 10

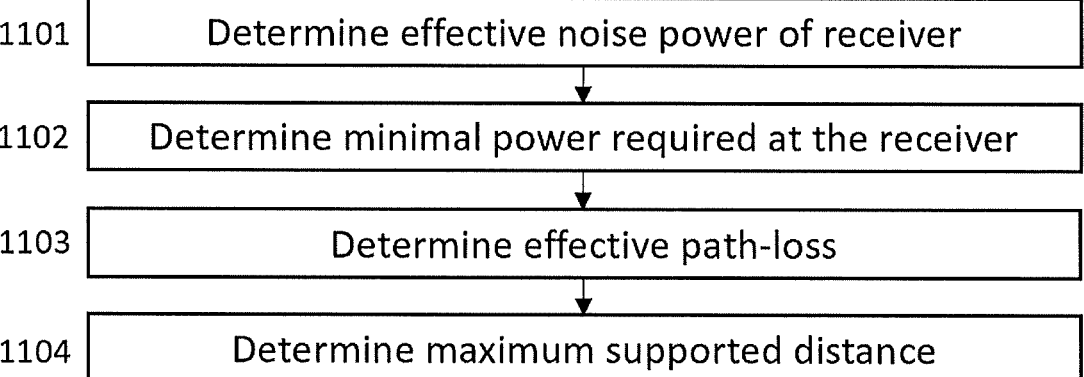

1101 Determine effective noise power of receiver

1102 Determine minimal power required at the receiver

1103 Determine effective path-loss

1104 Determine maximum supported distance

DETERMINING TRANSMIT POWER PER BEAM PAIR

FIELD

The following exemplary embodiments relate to wireless communication and to wireless sensing.

BACKGROUND

In wireless sensing technologies, for example radars, it is desirable to mitigate self-interference between a transmitter and a receiver.

SUMMARY

The scope of protection sought for various exemplary embodiments is set out by the claims. The exemplary embodiments and features, if any, described in this specification that do not fall under the scope of the claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: determine, per transmit and receive beam pair of a plurality of beam pairs, a transmit power value based at least partly on a saturation power value of one or more analog-to-digital converters at a receiver; and transmit, via a transmitter, a signal using the determined transmit power value and a corresponding transmit beam per transmit and receive beam pair of the plurality of beam pairs.

According to another aspect, there is provided an apparatus comprising means for: determining, per transmit and receive beam pair of a plurality of beam pairs, a transmit power value based at least partly on a saturation power value of one or more analog-to-digital converters at a receiver; and transmit, via a transmitter, a signal using the determined transmit power value and a corresponding transmit beam per transmit and receive beam pair of the plurality of beam pairs.

According to another aspect, there is provided a method comprising: determining, per transmit and receive beam pair of a plurality of beam pairs, a transmit power value based at least partly on a saturation power value of one or more analog-to-digital converters at a receiver; and transmit, via a transmitter, a signal using the determined transmit power value and a corresponding transmit beam per transmit and receive beam pair of the plurality of beam pairs.

According to another aspect, there is provided a computer program product comprising program instructions which, when run on a computing apparatus, cause the computing apparatus to perform at least the following: determining, per transmit and receive beam pair of a plurality of beam pairs, a transmit power value based at least partly on a saturation power value of one or more analog-to-digital converters at a receiver; and transmit, via a transmitter, a signal using the determined transmit power value and a corresponding transmit beam per transmit and receive beam pair of the plurality of beam pairs.

According to another aspect, there is provided a computer program comprising instructions for causing an apparatus to perform at least the following: determining, per transmit and receive beam pair of a plurality of beam pairs, a transmit power value based at least partly on a saturation power value of one or more analog-to-digital converters at a receiver; and transmit, via a transmitter, a signal using the determined transmit power value and a corresponding transmit beam per transmit and receive beam pair of the plurality of beam pairs.

According to another aspect, there is provided a computer readable medium comprising program instructions for causing an apparatus to perform at least the following: determining, per transmit and receive beam pair of a plurality of beam pairs, a transmit power value based at least partly on a saturation power value of one or more analog-to-digital converters at a receiver; and transmit, via a transmitter, a signal using the determined transmit power value and a corresponding transmit beam per transmit and receive beam pair of the plurality of beam pairs.

According to another aspect, there is provided a non-transitory computer readable medium comprising program instructions for causing an apparatus to perform at least the following: determining, per transmit and receive beam pair of a plurality of beam pairs, a transmit power value based at least partly on a saturation power value of one or more analog-to-digital converters at a receiver; and transmit, via a transmitter, a signal using the determined transmit power value and a corresponding transmit beam per transmit and receive beam pair of the plurality of beam pairs.

According to another aspect, there is provided a system configured to: determine, per transmit and receive beam pair of a plurality of beam pairs, a transmit power value based at least partly on a saturation power value of one or more analog-to-digital converters at a receiver; and transmit, via a transmitter, a signal using the determined transmit power value and a corresponding transmit beam per transmit and receive beam pair of the plurality of beam pairs.

According to another aspect, there is provided a system comprising means for: determining, per transmit and receive beam pair of a plurality of beam pairs, a transmit power value based at least partly on a saturation power value of one or more analog-to-digital converters at a receiver; and transmit, via a transmitter, a signal using the determined transmit power value and a corresponding transmit beam per transmit and receive beam pair of the plurality of beam pairs.

BRIEF DESCRIPTION OF THE DRAWINGS

In the following, various exemplary embodiments will be described in greater detail with reference to the accompanying drawings, in which

FIG. 5 illustrates a flow chart according to an exemplary embodiment;

FIG. 6 illustrates a flow chart according to an exemplary embodiment;

FIG. 7 illustrates a flow chart according to an exemplary embodiment;

FIG. 8 illustrates a flow chart according to an exemplary embodiment;

FIG. 9 illustrates a flow chart according to an exemplary embodiment;

FIG. 10 illustrates a flow chart according to an exemplary embodiment;

FIG. 11 illustrates a flow chart according to an exemplary embodiment;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A), new radio (NR, 5G), beyond 5G, or sixth generation (6G) without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
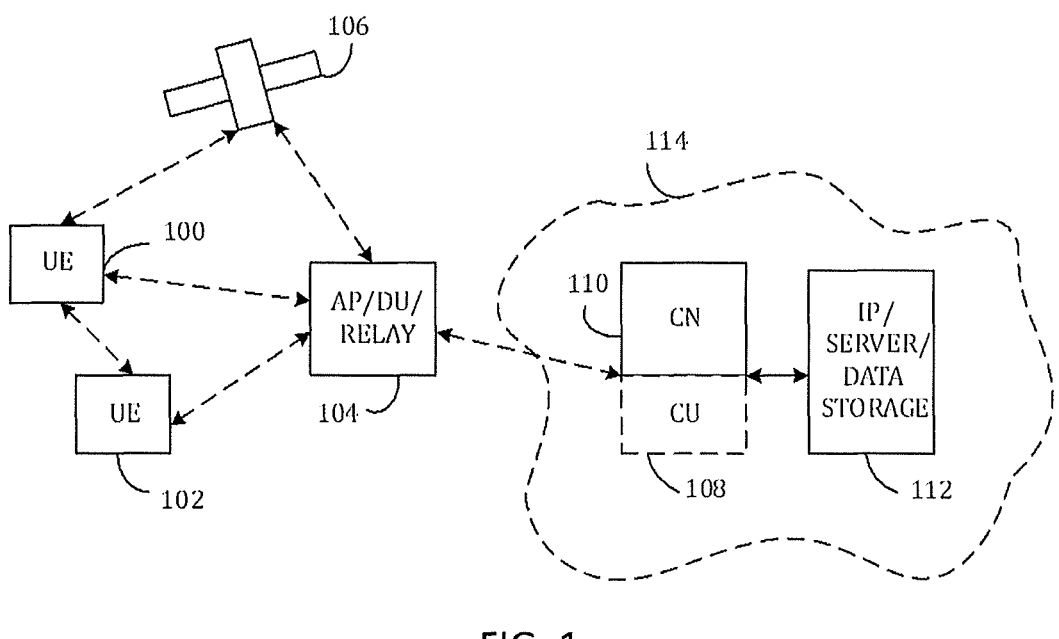
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to an eNodeB or a gNodeB, herein collectively referred to as (e/g)NodeB may be called uplink or reverse link, and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The (e/g)NodeB may also be referred to as a base station, an access point or any other type of interfacing device including a relay station capable of operating in a wireless environment. The (e/g)NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW) for providing connectivity of user devices (UEs) to external packet data networks, mobility management entity (MME), access and mobility management function (AMF), or location management function (LMF), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node.

An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s), and/or between the IAB node and other IAB nodes (multi-hop scenario).

Another example of such a relay node may be a layer 1 relay called a repeater. The repeater may amplify a signal received from a base station and forward it to a UE, and/or amplify a signal received from the UE and forward it to the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable or wearable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs may be a Home(e/g)nodeB.

Furthermore, the (e/g)nodeB or base station may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2)

processing; and a central unit (CU) (also known as a centralized unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g)nodeB or base station. The DU may be defined as a logical node hosting radio link control (RLC), medium access control (MAC) and/or physical (PHY) layers of the (e/g)nodeB or base station. The operation of the DU may be at least partly controlled by the CU. The CU may comprise a control plane (CU-CP), which may be defined as a logical node hosting the RRC and the control plane part of the PDCP protocol of the CU for the (e/g)nodeB or base station. The CU may further comprise a user plane (CU-UP), which may be defined as a logical node hosting the user plane part of the PDCP protocol and the SDAP protocol of the CU for the (e/g)nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

In comparison to previous generations, 5G improves the performance of wireless communication networks with regard to latency, throughput and spectral efficiency. The next generations, for example the sixth generation (6G) may extend wireless communication networks further, converting communication networks to a joint physical-biological network, where a controller may be capable of sensing the state and behaviour of each active and passive node, device, and/or object within its environment, by performing joint communication and sensing (JCAS).

Thus, one of the challenges for the next generation(s) of wireless communication networks is to provide sensing capabilities. As these features or services may all require the same physical resource, challenges arise regarding sharing the resource, and determining the quality of service (QoS) of such sensing capabilities.

Full-duplex transceivers are complex to implement, and useful self-interference cancellation schemes for transceivers may not yet be available. Thus, for beyond 5G and 6G sensing units, a physical separation between the transmitter and the receiver may be required. In such scenarios, the presence of self-interference coming from the direct path between the transmitter and the receiver may impact the correct working of the system and should be addressed, for example in the case where these two devices are located close to each other.

Current communication access points are specialized hardware, considering and exploiting communication properties to enhance link performance. This may require that the transmitter and receiver are spatially separated. This may be derived from the fact that the hardware is designed to transmit information over a spatial distance. Going towards sensing capabilities, the hardware for radar may be co-located. For example, in a frequency-modulated continuous-wave (FMCW) radar, the received signal may be demodulated with the transmitted signal in the analog domain in the same hardware chain (see FIG. 2). Self-interference can therefore be already estimated and removed while operating in the range domain.

Since this feature of a continuous wave does not contain information, full-duplex transceivers are currently being researched. However, full-duplex transceivers may be susceptible to a large amount of environmental properties, as they may require perfect (or near-perfect) time/frequency and leakage knowledge, leading to a cumbersome tuning process.

Figure 2:
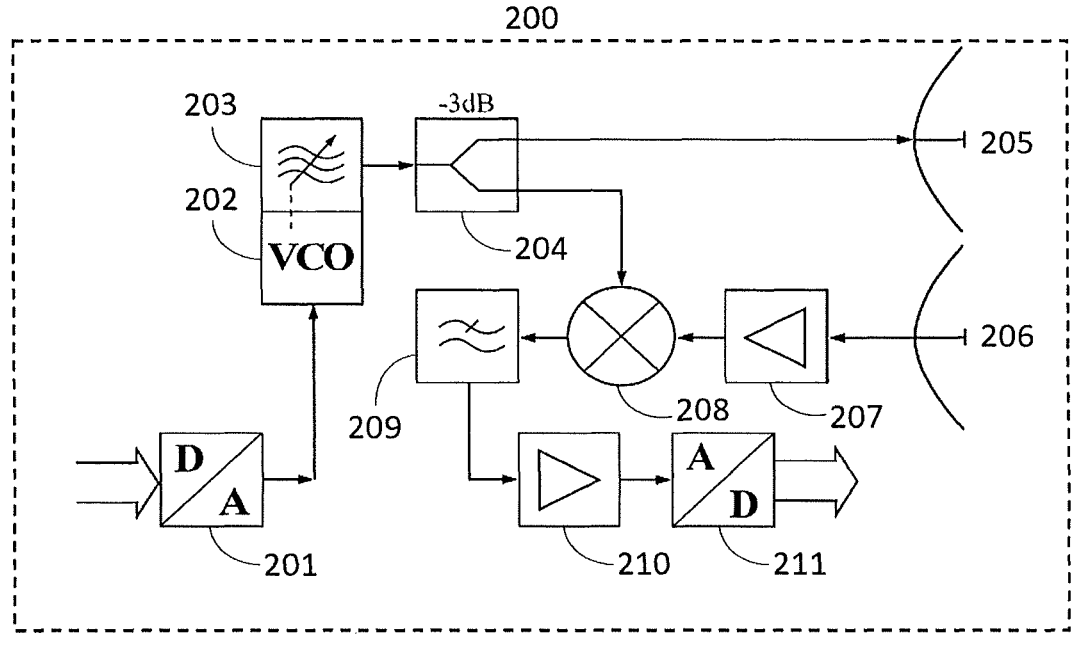
FIG. 2 illustrates an exemplary block diagram of a frequency-modulated continuous-wave (FMCW) radar.

FIG. 2 illustrates an exemplary block diagram of an FMCW radar 200. An FMCW radar is a type of radar sensor, which radiates continuous transmission power similarly to a continuous wave (CW) radar. However, in contrast to the CW 1o radar, the FMCW radar can change its operating frequency during the measurement. That is, the transmission signal may be modulated in frequency (or in phase).

Referring to FIG. 2, the FMCW radar 200 comprises a digital-to-analog converter (DAC) 201, a voltage-controlled oscillator (VCO) 202, a radio frequency (RF) generator 203, a power divider 204, a transmitting antenna 205, a receiving antenna 206, a pre-amplifier 207, a mixer 208, a low-pass filter 209, a baseband amplifier 210, and an analog-to-digital converter (ADC) 211 to the interface of a computer.

Alternatively, a system with separated transmit and receive hardware may be used as an orthogonal frequency-division multiplexing (OFDM) radar system. In this case, the system may require getting the channel estimate first before being able to limit interference in the range domain. The transmitted sequence may be equalized out in the digital domain to get the channel estimate.

Figure 3:
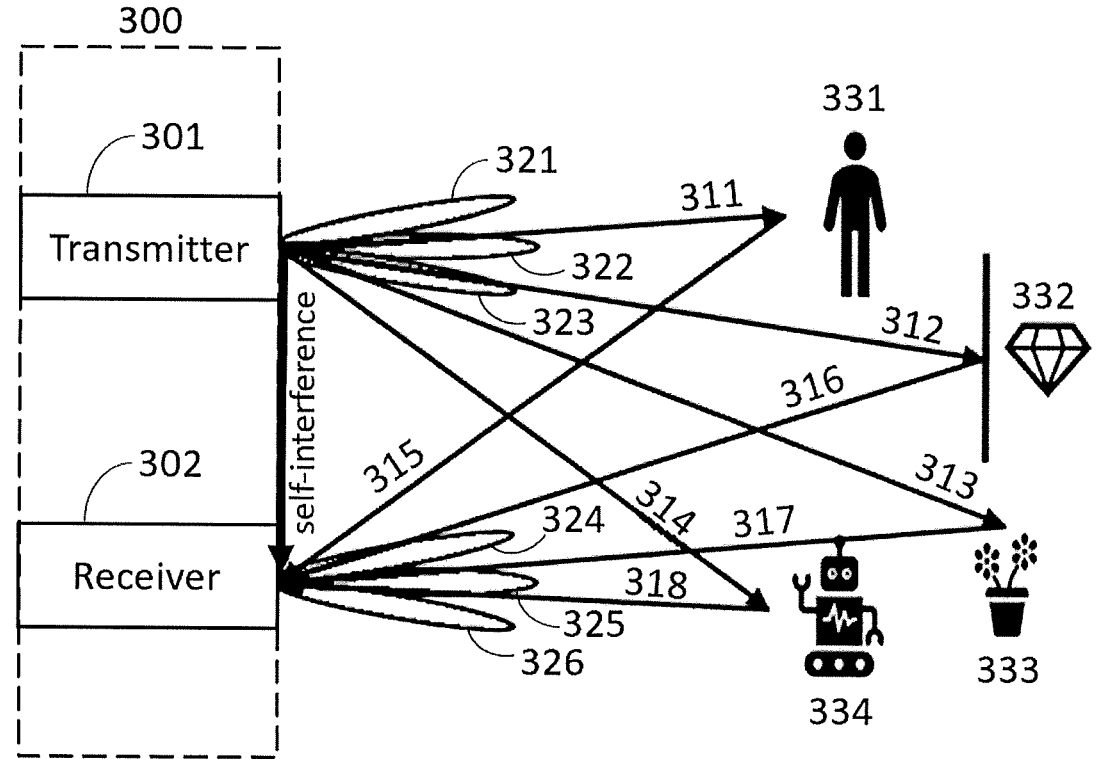
FIG. 3 illustrates an exemplary embodiment of an orthogonal frequency-division multiplexing (OFDM) radar system.

FIG. 3 illustrates an exemplary embodiment of an OFDM radar system 300. The system 300 comprises a transmitter 301 and a receiver 302, wherein the transmitter 301 and the receiver 302 are spatially separated in different locations. As a non-limiting example, the distance between the transmitter 301 and the receiver 302 may be at least 1 meter. Alternatively, the distance may be less than 1 meter. The receiver 302 may also be referred to as a sniffer.

The OFDM radar system 300 may be used to enable joint communication and sensing. In other words, the system 300 may comprise a communication function and a sensing function. The communication function means that the system 300 may operate as an access point of a wireless communication network and communicate with one or more terminal devices, for example. In other words, the system 300 may comprise, or be comprised in, an access point of a wireless communication network.

The sensing function means that the system 300 may transmit one or more wireless signals 311, 312, 313, 314 from the transmitter 301 via one or more transmit beams 321, 322, 323, and use one or more reflected echo signals 315, 316, 317, 318 received at the receiver 302 via one or more receive beams 324, 325, 326 to detect one or more target objects 331, 332, 333, 334 and determine one or more properties such as distance, direction, velocity, and/or size of a given target object. In other words, radio waves transmitted from the transmitter 301 may reflect off a given target object 331, 332, 333, 334 and return to the receiver 302, providing information about the target object's location and velocity, for example. The one or more target objects may comprise at least one terminal device 334, for example.

Herein the term "beam" may refer to a communication resource. Different beams may be considered as different resources. A beam may also be represented as a spatial filter, spatial direction, or angle. A technology for forming a beam may be a beamforming technology or another technology. The beamforming technology may be specifically a digital beamforming technology, analog beamforming technology, or a hybrid digital/analog beamforming technology. One beam may include one or more antenna ports and be configured for a data channel, a control channel, or the like. The one or more antenna ports forming one beam may also be considered as an antenna port set. A beam may be configured with a set of resources, or a set of resources for measurement.

Figure 4:
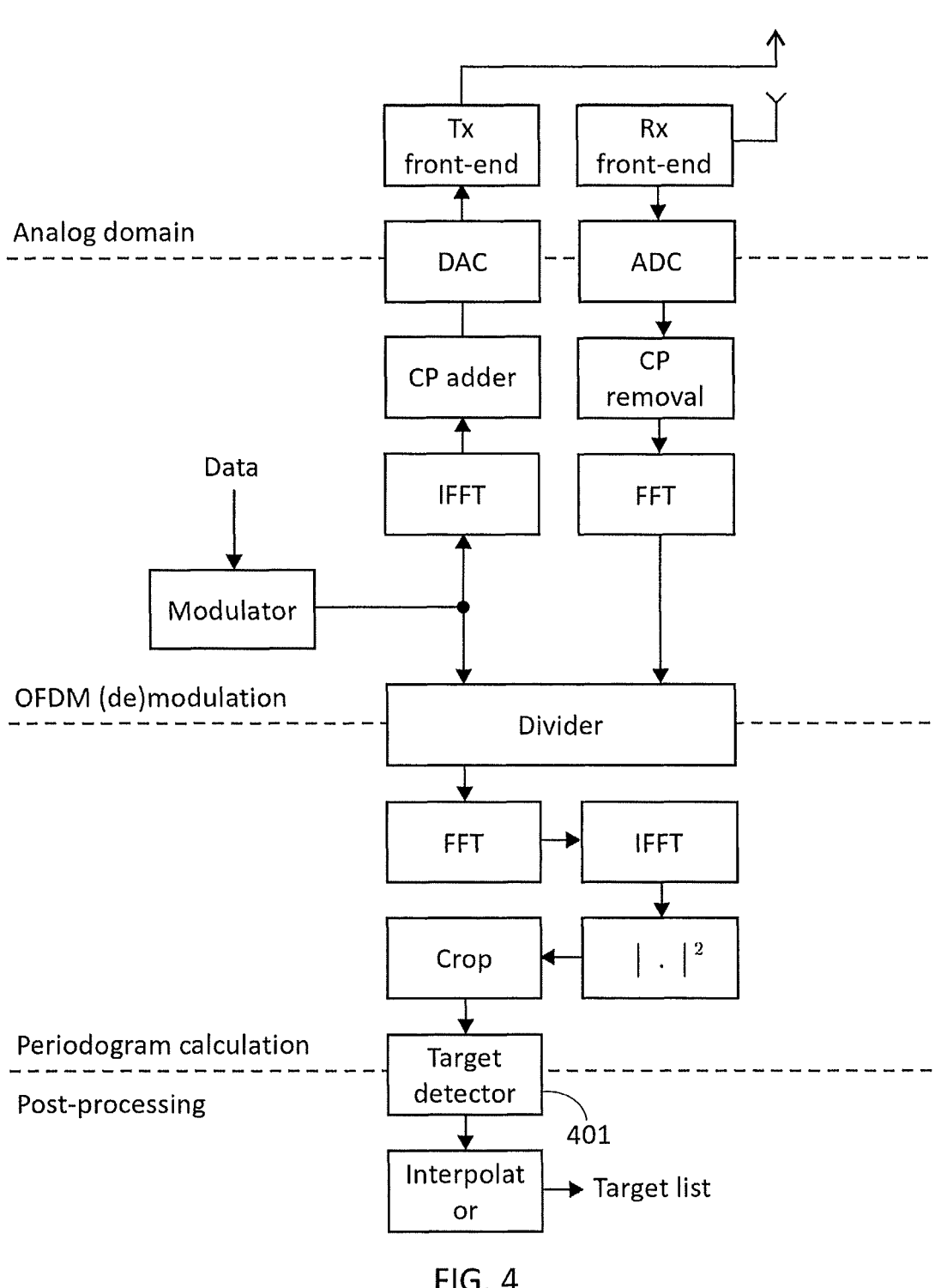
FIG. 4 illustrates an example of a transmit and receive chain of a periodogram-based OFDM radar system.

FIG. 4 illustrates an example of a transmit and receive chain of a periodogram-based OFDM radar system. In FIG. 4, CP is an abbreviation for cyclic prefix, IFFT is an abbreviation for inverse fast Fourier transform, and FFT is an abbreviation for fast Fourier transform. In order to extract the positions of target objects from the periodogram, the periodogram-based OFDM radar system may comprise a target detector 401. The target detector 401 may be used to identify peaks in the periodogram originating from valid target objects, distinguishing them from peaks originating from other sources, such as additive white Gaussian noise (AWGN) or ambiguities caused by the side lobes of the target objects.

When carrying out analog-to-digital conversion, the input signal should be kept within the input voltage range of the analog-to-digital converter (ADC). If the input signal exceeds the input voltage range of the ADC, the ADC may become saturated. Thus, operating in the digital domain may require to avoid saturating the ADC. Otherwise, strong non-linearities may corrupt the information contained in the signal by distorting it (e.g., via clipping).

To limit interference, the received beamformer may be separated in time by using time-division duplexing (TDD), or in frequency by using frequency-division duplexing (FDD) from the transmitter at the access point side, and thus only other access points or devices in different cells may create interference on the received signal (in general, relaying the condition on the beamformer to null the side lobes).

In contrast, sensing networks may require a stronger resilience against self-interference, as the transmit beamforming may be pointed into the same direction as the received beamforming in the same cell at the same time and frequency slot (to measure reflections and scattering, similarly as in radar applications). So far, for communication-only purposes, transmission, and reception by two terminals inherently pointing their beams towards the same angle, which may introduce heavy interference, has not been required nor wanted.

As an alternative to full-duplex systems, the transmitter and the receiver may be spatially separated to reduce self-interference. However, this may not be sufficient on its own.

Beam patterns and their angular interference/focus may change depending on the direction of transmission. For example, if the interference of the beam pattern is low, then this may allow larger transmit power than for a beam pattern associated with higher interference. However, it is unclear which specific power level reduction is required for a specific set of hardware or beam patterns.

This challenge may be addressed by some exemplary embodiments by providing a method to relax the self-interference cancelation schemes, while still optimizing the sensing and communication capabilities at access points.

When running sensing operations, different beam configurations may correspond to different angular radiation patterns and, thus, create different self-interference power levels depending on the transmit and receive beamforming used, if simultaneously transmitting and receiving in the same cell.

Instead of using a static power reduction over all beam sets, some exemplary embodiments provide a method to adjust the power reduction in a self-calibration step depending on the hardware and deployment. Accordingly, a dynamic and joint optimization approach may be provided to optimize sensing operations (e.g., the scenario of FIG. 3) by limiting the power in certain angular domains.

To this end, it may be assumed that the transmitter and receiver operations (e.g., their used beamforming and receive combining) are synchronized.

Some exemplary embodiments provide (dynamically), per beam-pair combination (transmit beam and receive beam), power reduction for sensing operations, with the purpose of keeping the interference from the transmitter to be below the ADC saturation level. In other words, some exemplary embodiments may dynamically optimize transmit power per beam pair to keep self-interference under control.

Furthermore, some exemplary embodiments may be used to predict, based on the selected power reduction per beam pair, updated and more accurate coverage/sensing maps. For instance, one could also determine, for each beam pair, the maximum distance of sensing operations, given a certain target reflection coefficient. The maximum distance, at which a minimum signal-to-noise ratio (SNR) may be achieved, can be determined based on the following: the determined transmit power, beamforming gains, path loss, and reflection coefficient for a given target object. Below the minimum SNR, the confidence of sensing measures may not be sufficient to provide meaningful information. Thus, if the transmit power is at a certain level in a certain direction (angle), one can estimate the most distant object. Doing so over all angles may create a coverage/sensing map, which can be "sensed".

Thus, some exemplary embodiments may avoid sacrificing communication performance by downscaling the transmit power (a) of the full system and (b) for both communications and sensing operations. Moreover, thanks to the dynamic power reduction, it may be possible to use higher transmit powers in some directions, improving the reach of sensing operations.

Knowing the self-interference level at the receiver side per beam-pair configuration may enable keeping the ADC below saturation. This allows to optimize receiver interference rejection mechanisms and to keep it directly under control at the transmitter side, as well as to extend their range, fully leveraging the transceivers' potential for both communications and sensing operations.

FIG. 5 illustrates a flow chart according to an exemplary embodiment. The steps illustrated in FIG. 5 may be performed by an apparatus such as, or comprised in, a terminal device or an access point of a wireless communication network, wherein the apparatus is capable of joint communication and sensing. The apparatus may comprise, or be connected to, a transmitter and a receiver that are spatially separated.

Referring to FIG. 5, in step 501, a transmit power value is determined per beam pair of a plurality of beam pairs, wherein the transmit power value is determined based at least partly on a saturation power value of one or more analog-to-digital converters (ADCs) at the receiver. In other words, a beam-pair-specific transmit power value may be determined for each beam pair. A given beam pair may comprise a transmit beam used at the transmitter and a receive beam used at the receiver. Herein a beam pair may also be referred to as a transmit and receive beam pair, a transmit and receive angle pair comprising a transmit angle and a receive angle, or a transmit and receive direction pair comprising a transmit direction and a receive direction.

In step 502, a signal is transmitted via the transmitter by using the determined transmit power value and a corresponding transmit beam per beam pair of the plurality of beam pairs. In other words, the signal is transmitted using the transmit beam of the beam pair corresponding to the transmit power value determined for that beam pair. Using the determined transmit power value means that the transmit power of the signal is set to correspond to the determined transmit power value.

The signal may be transmitted by using one transmit beam at a time, or the signal may be transmitted by using multiple transmit beams simultaneously. For example, in multi-user MIMO (MU-MIMO), the transmitter may transmit multiple transmit beams at the same time.

To determine which possible combinations of transmit beamforming and receive combining weights (or the corresponding angle pairs) need to be used (e.g., by the required sensing operations), for each of the previous pairs, the system may transmit at a pre-determined initial power, low enough not to lead ADCs to saturation, but also to be above quantization noise. Then, the remaining ADC range may be estimated, and the transmit power value to be used may be determined based on the pre-determined initial power, the remaining ADC range, and a safety margin. The determined transmit power value to be used may be saved, or stored, in a memory.

Alternatively, the transmit power value may be determined by means of simulations and/or analytical evaluations, considering the ADC limit(s), beamforming gains and expected channel or isolation between the transmitter and the receiver.

Alternatively, the transmit power value may be determined by performing transmission at maximum transmit power and reception with the corresponding weights. If the received signal saturates due to self-interference, the procedure may be repeated by reducing the transmit power. Whether the received signal saturates or not may be determined based on at least one of the following: the signal does not saturate ADC(s), and/or the received signal power is below a threshold.

When performing sensing operations using one of the available beam pairs, the transmit power value determined at the previous step may be used.

FIG. 6 illustrates a flow chart according to another exemplary embodiment. The steps illustrated in FIG. 6 may be performed by an apparatus such as, or comprised in, a terminal device or an access point of a wireless communication network, wherein the apparatus is capable of joint communication and sensing. The apparatus may comprise, or be connected to, a transmitter and a receiver that are spatially separated.

Referring to FIG. 6, in step 601, a beam set comprising a plurality of beam pairs is obtained. A given beam pair may be denoted as p herein, where p∈χ. Herein χ denotes the set of beams available at the transmitter and the receiver, i.e., all possible beam combinations. A given beam pair p comprises a transmit beam used at the transmitter and a receive beam used at the receiver.

In step 602, a transmit power value $T_p$ is determined per beam pair p of the plurality of beam pairs based at least partly on a saturation power value of one or more ADCs at the receiver. In other words, a beam-pair-specific transmit power value $T_p$ may be determined for each beam pair p.

The determined transmit power value $T_p$ may then be used when sensing over p, as described in steps 603-605.

In step 603, a signal is transmitted via the transmitter by using the determined transmit power value $T_9$ and a corresponding transmit beam per beam pair p of the plurality of beam pairs. In other words, one signal may be transmitted for each beam pair p by using the transmit beam of a given beam pair. That is, the signals may be transmitted in different spatial directions (transmit beams).

In step 604, a reflected, scattered or diffracted signal of the transmitted signal is received via the receiver by using a receive beam per beam pair p of the plurality of beam pairs. In other words, one reflected, scattered or diffracted signal may be received for each beam pair p by using the receive beam of a given beam pair.

In step 605, one or more properties of a target object may be determined based at least partly on the reflected, scattered or diffracted signal, wherein the reflected, scattered or diffracted signal is reflected, scattered or diffracted from the target object. For example, the one or more properties may comprise at least one of: a distance, a direction, a velocity and/or a size of the target object.

Steps 601-602 may be run at initialization, when the system is installed or moved or rebooted. After that, it may not require periodical updates at runtime. However, if the beam sets are changed, then this procedure may be run again. Moreover, this approach may be suited for example for a grid of beams setting, which may be used in massive MIMO and mmWave systems.

FIG. 7 illustrates a flow chart according to an exemplary embodiment for determining the transmit power value. In other words, the steps illustrated in FIG. 7 may be comprised in step 501 of FIG. 5 or step 602 of FIG. 6.

The steps illustrated in FIG. 7 may be performed by an apparatus such as, or comprised in, a terminal device or an access point of a wireless communication network, wherein the apparatus is capable of joint communication and sensing. The apparatus may comprise, or be connected to, a transmitter and a receiver that are spatially separated.

Referring to FIG. 7, in step 701, a lower threshold $P_L$ and a higher threshold $P_H$ for an initial transmit power value P are determined.

The lower threshold $P_L$ may be set such that the received self-interference power is above the quantization noise of one or more ADCs. For example, the lower threshold $P_L$ may be determined at operations start by iteratively raising the transmit power from zero until the received signal without digital self-interference cancellation is above a threshold given by the quantization noise power.

The higher threshold $P_H$ may be set such that there is no risk of saturating the one or more ADCs. For example, the higher threshold $P_H$ may be determined with analytical techniques considering beams generating maximal gain.

In step 702, the initial transmit power value P is selected in the interval $[P_L, P_H]$, i.e., between the lower threshold $P_L$ and the higher threshold $P_H$.

In step 703, for each beam pair $p \in \chi$, a signal is transmitted by using the initial transmit power value P. A given beam pair p comprises a transmit beam used at the transmitter and a receive beam used at the receiver.

In step 704, a reflected, scattered or diffracted signal of the transmitted signal is received for each beam pair p, and a received power value $R_p$ of the reflected, scattered or diffracted signal is measured for each beam pair p.

In step 705, the difference $\Delta$ between the received power value $R_p$ and a saturation power value S of the one or more ADCs at the receiver is determined for each beam pair p, with an arbitrary safety margin value $\delta \geq 0$.

If the quantities are in logarithmic scale, for example dB (absolute values), dBW or dBm (for power), then the difference may be determined for each beam pair $p \in \chi$ as:

$$\Delta = S - R_p - \delta$$

In step 706, the transmit power value $T_p$ is determined for each beam pair p based on the difference $\Delta$.

If the quantities are in logarithmic scale, for example dB (absolute values), dBW or dBm (for power), then the transmit power value may be determined for each beam pair $p \in \chi$ as:

$$T_p = P + \Delta$$

Alternatively, if the quantities are in linear scale (W, mW, etc.) instead of logarithmic scale, then the difference $\Delta$ and the transmit power value $T_p$ may be determined for each beam pair $p \in \chi$ as follows:

$$\Delta = \frac{S}{R_p \delta}$$

$$T_p = P\Delta$$

FIG. 8 illustrates a flow chart according to another exemplary embodiment for determining the transmit power value. In other words, the steps illustrated in FIG. 8 may be comprised in step 501 of FIG. 5 or step 602 of FIG. 6.

The steps illustrated in FIG. 8 may be performed by an apparatus such as, or comprised in, a terminal device or an access point of a wireless communication network, wherein the apparatus is capable of joint communication and sensing. The apparatus may comprise, or be connected to, a transmitter and a receiver that are spatially separated.

In step 801, a saturation power value S for one or more ADCs at the receiver is obtained.

In step 802, a combined transmitter and receiver beamforming power gain $G_p$ per beam pair p is obtained across the angle corresponding to the main path (e.g., direct path) of the self-interference.

In step 803, a power isolation coefficient I between the transmitter and the receiver is obtained.

The values of S, $G_p$ and I may be obtained by means of system design, simulations, and/or analytical considerations.

In step 804, the transmit power value $T_p$ for each beam pair p may be determined based at least partly on the saturation power value S, the beamforming power gain $G_p$, and the power isolation coefficient I.

If the quantities are in logarithmic scale, for example dB (absolute values), dBW or dBm (for power), then the transmit power value $T_p$ may be determined for each beam pair $p \in \chi$ as follows:

$$T_p = S - G_p + I - \delta$$

where $\delta$ is an arbitrary safety margin value ($\delta \geq 0$).

Alternatively, if the quantities are in linear scale (W, mW, etc.) instead of logarithmic scale, then the transmit power value $T_p$ may be determined for each beam pair $p \in \chi$ as follows:

$$T_p = \frac{SI}{G_p \delta}$$

FIG. 9 illustrates a flow chart according to another exemplary embodiment for determining the transmit power value. In other words, the steps illustrated in FIG. 9 may be comprised in step 501 of FIG. 5 or step 602 of FIG. 6.

The steps illustrated in FIG. 9 may be performed by an apparatus such as, or comprised in, a terminal device or an access point of a wireless communication network, wherein the apparatus is capable of joint communication and sensing. The apparatus may comprise, or be connected to, a transmitter and a receiver that are spatially separated.

In this exemplary embodiment, the transmit power value may be determined by an iterative procedure. This iterative procedure may require less supervision than the other alternatives described above, but this iterative procedure may be slower to implement. However, since the procedure may be executed just once per hardware installation or re-positioning, this may not cause serious issues.

In step 901, the transmit power parameter $T_p$ is initialized for each beam pair $p \in \chi$ by setting $T_p = H$, where H is an initial transmit power value. For example, H may correspond to the maximum available transmit power at the transmitter. A given beam pair p comprises a transmit beam used at the transmitter and a receive beam used at the receiver.

In step 902, a signal is transmitted by using the initial transmit power value $T_p = H$ for each beam pair p.

In step 903, the received power value $R_p$ of the signal is measured for each beam pair p.

In step 904, it is determined whether one or more ADCs are saturating.

If the quantities are in logarithmic scale, for example dB (absolute values), dBW or dBm (for power), then the ADC(s) may be determined to be saturating, if $R_p > S - \delta$, where S is the saturation power value of one or more ADCs at the receiver, and $\delta$ is an arbitrary safety margin value ($\delta \geq 0$).

Alternatively, if the quantities are in linear scale (e.g., W, mW, etc.) instead of logarithmic scale, then the ADC(s) may be determined to be saturating, if $R_p > S / \delta$.

In step 905-1, if the ADC(s) are saturating (904: yes), then the transmit power value $T_p$ is reduced for each pair p for example by a certain pre-defined amount, and the process returns to step 902, where another signal is transmitted by using the reduced transmit power value.

In step 905-2, if the ADC(s) are not saturating (904: no), then the current value of $T_p$ is determined, or set, as the transmit power value to be used for each beam pair p (e.g., to transmit a signal in step 502 of FIG. 5 or step 603 of FIG. 6).

In other words, steps 902, 903, 904 and 905-1 may be performed iteratively until it is determined that the ADC(s) are not saturating.

FIG. 10 illustrates a flow chart according to an exemplary embodiment for estimating the communication capabilities, i.e., communication coverage without interference. In this exemplary embodiment, it is assumed that the self-interference received power is at least comparable or higher than the power of any signal scattered back to the receiver. This may be a safe assumption given the reduced travel distance.

The steps illustrated in FIG. 10 may be performed, for example, after step 604 of FIG. 6. The steps illustrated in FIG. 10 may be performed by an apparatus such as, or comprised in, a terminal device or an access point of a wireless communication network, wherein the apparatus is capable of joint communication and sensing. The apparatus may comprise, or be connected to, a transmitter and a receiver that are spatially separated.

The quantities described below may be in linear domain (as opposed to the logarithmic scale).

Referring to FIG. 10, in step 1001, the effective noise power $P_n$ of the receiver is determined for each supported transmit beam b E B, where B is the set of transmit beams available at the transmitter. The transmit beam may also be referred to as a transmit angle or transmit direction herein.

For instance, one could take the maximum received signal amplitude M, and determine $$P_n = \frac{\Delta^2}{3} = \frac{M^2}{3 \cdot 2^{2(k-1)}},$$

where k is the number of bits used in the ADC. $\Delta$ is the difference between the received power $R_p$ and the ADC saturation power S, with an arbitrary safety margin value $\delta \geq 0$.

In step 1002, the minimum power $P_{min} = P_n SNR_{c,tresh}$ required at the receiver is determined for each supported transmit beam b, where $SNR_{c,tresh}$ is a signal-to-noise ratio threshold value required for communication.

In step 1003, the maximum supported path-loss $$P_L = \frac{P_{min}}{T_p G_{TX}(b) G_{RX}(b)}$$

is determined for each supported transmit beam b, using the gains of the transmit (and receive, if available) antenna array $G_{TX}(b) G_{RX}(b)$, if pointing at the beam b.

In step 1004, the maximum supported communication distance $$d = \left( \frac{\lambda}{4\pi \sqrt{P_L}} \right)$$

is determined per beam b using a wavelength $\lambda$. The wavelength $\lambda$ may be determined as $$\lambda = \frac{c}{f_c},$$

where $f_c$ is the used carrier frequency (center frequency of the communication signal), and c is the speed of light.

Thus, a coverage map may be created as a function of the transmit beam. The maximum supported communication distance may be used to predict whether a given sensing request makes sense, or whether any useful information can be determined from this angle. It may also be used to select a different receive beam with better conditioning for this specific transmit beam.

FIG. 11 illustrates a flow chart according to an exemplary embodiment for estimating the sensing capabilities. In this exemplary embodiment, it is assumed that the self-interference received power is at least comparable or higher than the power of any signal scattered back to the receiver. This may be a safe assumption given the reduced travel distance.

The steps illustrated in FIG. 11 may be performed, for example, after step 604 of FIG. 6. The steps illustrated in FIG. 11 may be performed by an apparatus such as, or comprised in, a terminal device or an access point of a wireless communication network, wherein the apparatus is capable of joint communication and sensing. The apparatus may comprise, or be connected to, a transmitter and a receiver that are spatially separated.

The quantities described below may be in linear domain.

Referring to FIG. 11, in step 1101, the effective noise power $P_n$ of the receiver is determined for each supported beam pair p∈ P, where P is the set of beam pairs available at the transmitter and the receiver. A given beam pair comprises a transmit beam and a receive beam. Herein a beam pair may also be referred to as a transmit and receive beam pair, an angle pair or a direction pair.

For instance, one could take the maximum received signal amplitude M, and determine $$P_n = \frac{\Delta^2}{3} = \frac{M^2}{3 \cdot 2^{2(k-1)}},$$

where k is the number of bits used in the ADC. $\Delta$ is the difference between the received power $R_p$ and the ADC saturation power S, with an arbitrary safety margin value $\delta \geq 0$.

In step 1102, the minimum power $P_{min} = (P_n + P_q(T_p)) SNR_{s,tresh}$ required at the receiver is determined for each beam pair p, where $SNR_{s,tresh}$ is a signal-to-noise ratio threshold value required for sensing.

The quantization noise power $P_q(T_p)$ may be determined for each beam pair p based on the received signal.

In step 1103, the effective path-loss $$P_L = \frac{P_{min}}{T_p G_{TX}(p) G_{RX}(p)}$$

is determined, using the gains of the transmit and receive antenna arrays $G_{TX}(p) G_{RX}(P)$, if using the beam pair p.

In step 1104, the distance $$d = \frac{1}{2}\left(\frac{\lambda}{4\pi\sqrt{P_L}}\right)$$

is determined per beam pair p using a wavelength $\lambda$. The wavelength $\lambda$ may be determined as $$\lambda = \frac{c}{f_c},$$

where $f_c$ is the used carrier frequency (center frequency of the communication signal), and c is the speed of light.

Thus, a coverage map may be created as a function of the transmit-receive beam pair. The maximum supported sensing distance may be used to predict whether a given sensing request makes sense, or whether any useful information can be determined from this angle.

Extending this idea, one could think of overlaying these maps for different access points and reducing the effective coverage by an interference measure, to be summed to the estimated noise power $P_n$.

The steps and/or blocks described above by means of FIGS. 5-11 are in no absolute chronological order, and some of them may be performed simultaneously or in an order differing from the described one. Other steps and/or blocks may also be executed between them or within them.

A technical advantage provided by some exemplary embodiments is that they may prevent ADC saturation caused by self-interference. For example, some exemplary embodiments may be used to mitigate self-interference of full duplex systems and prevent them from achieving ADC saturation. This may be beneficial for example for current and future 6G JCAS systems, where sensing access points, but also sensing nodes (e.g., UEs or infrastructure equipment that run sensing operations, with support from cell access points) may be deployed in large numbers in both consumer or private networks. Moreover, thanks to the dynamic power reduction of some exemplary embodiments, it may be possible to use higher transmit powers in some directions, improving the reach of sensing operations.

To keep the self-interference from saturating the ADC, a different transmit power may be required for each matched beam-configuration. Summarizing the connection of limiting the transmit power per matched beam set, the remaining used power may directly correlate to the coverage achievable for communication (link budget analysis) and the sensing power (sensing budget analysis).

Figure 12:
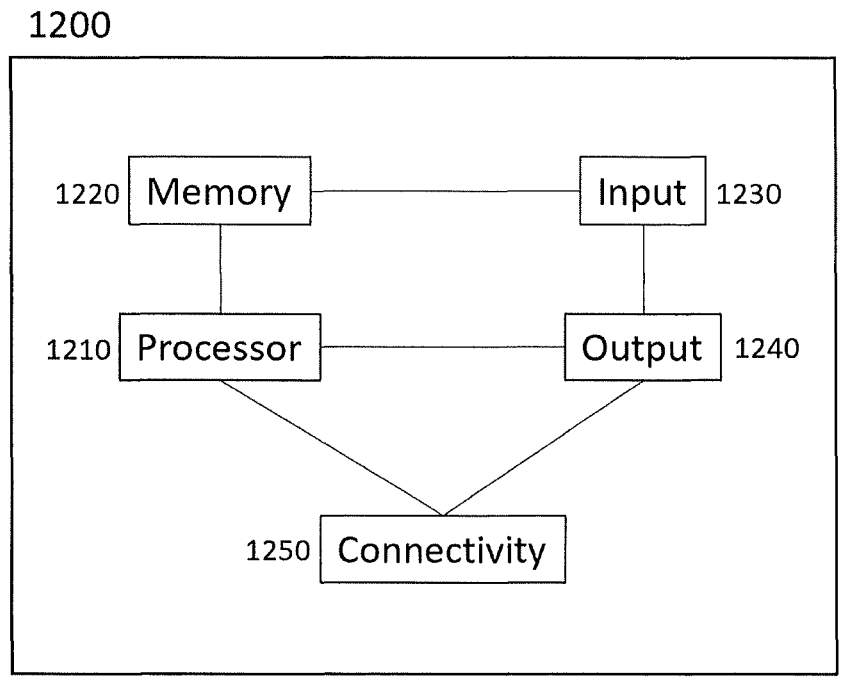
FIG. 12 illustrates an apparatus according to an exemplary embodiment.

FIG. 12 illustrates an apparatus 1200, which may be an apparatus such as, or comprised in, a terminal device, according to an exemplary embodiment. The terminal device may also be called a subscriber unit, mobile station, remote terminal, access terminal, user terminal, user device, or user equipment (UE). The apparatus 1200 comprises a processor 1210. The processor 1210 interprets computer program instructions and processes data. The processor 1210 may comprise one or more programmable processors. The processor 1210 may comprise programmable hardware with embedded firmware and may, alternatively or additionally, comprise one or more application-specific integrated circuits (ASICs).

The processor 1210 is coupled to a memory 1220. The processor is configured to read and write data to and from the memory 1220. The memory 1220 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1220 stores computer readable instructions that are executed by the processor 1210. For example, non-volatile memory stores the computer readable instructions and the processor 1210 executes the instructions using volatile memory for temporary storage of data and/or instructions.

The computer readable instructions may have been pre-stored to the memory 1220 or, alternatively or additionally, they may be received, by the apparatus, via an electromagnetic carrier signal and/or may be copied from a physical entity such as a computer program product. Execution of the computer readable instructions causes the apparatus 1200 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1200 may further comprise, or be connected to, an input unit 1230. The input unit 1230 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1230 may comprise an interface to which external devices may connect to.

The apparatus 1200 may also comprise an output unit 1240. The output unit may comprise or be connected to one or more displays capable of rendering visual content, such as a light emitting diode (LED) display, a liquid crystal display (LCD) and/or a liquid crystal on silicon (LCoS) display. The output unit 1240 may further comprise one or more audio outputs. The one or more audio outputs may be for example loudspeakers.

The apparatus 1200 further comprises a connectivity unit 1250. The connectivity unit 1250 enables wireless connectivity to one or more external devices. The connectivity unit 1250 comprises at least one transmitter and at least one receiver that may be integrated to the apparatus 1200 or that the apparatus 1200 may be connected to. The at least one transmitter comprises at least one transmission antenna, and the at least one receiver comprises at least one receiving antenna. The connectivity unit 1250 may comprise an integrated circuit or a set of integrated circuits that provide the wireless communication capability for the apparatus 1200. Alternatively, the wireless connectivity may be a hardwired application-specific integrated circuit (ASIC). The connectivity unit 1250 may comprise one or more components such as: power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1200 may further comprise various components not illustrated in FIG. 12. The various components may be hardware components and/or software components.

Figure 13:
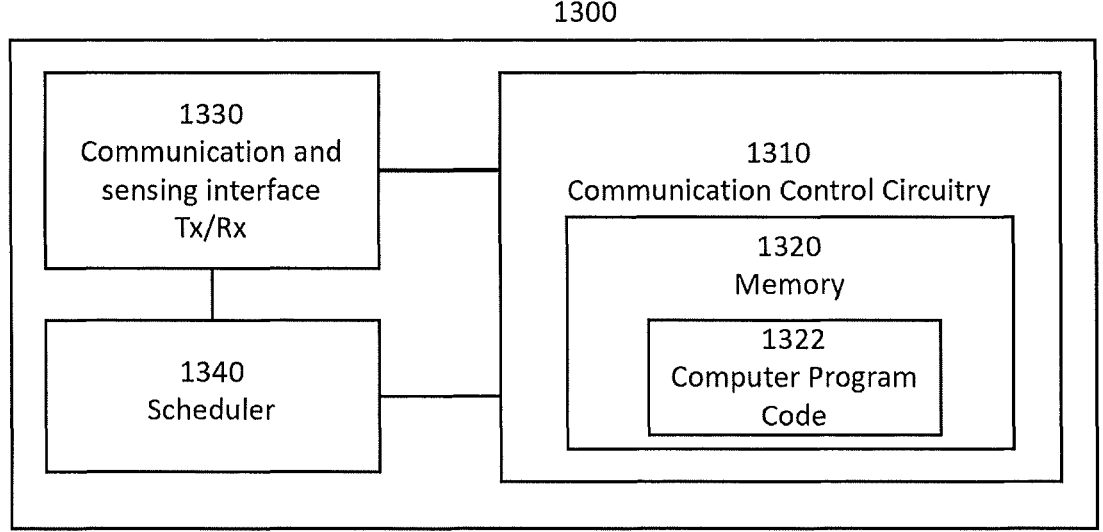
FIG. 13 illustrates an apparatus according to an exemplary embodiment.

The apparatus 1300 of FIG. 13 illustrates an exemplary embodiment of an apparatus such as, or comprised in, a network element of a wireless communication network. The network element may also be referred to, for example, as a network node, a RAN node, a NodeB, an LTE evolved NodeB (eNB), a gNB, a base station, an NR base station, a 5G base station, an access node, an access point (AP), a relay node, a repeater, an integrated access and backhaul (IAB) node, an IAB donor node, a distributed unit (DU), a central unit (CU), a baseband unit (BBU), a radio unit (RU), a radio head, a remote radio head (RRH), a transmission and reception point (TRP), or an orthogonal frequency-division multiplexing (OFDM) radar.

The apparatus 1300 may comprise, for example, a circuitry or a chipset applicable for realizing some of the described exemplary embodiments. The apparatus 1300 may be an electronic device comprising one or more electronic circuitries. The apparatus 1300 may comprise a communication control circuitry 1310 such as at least one processor, and at least one memory 1320 storing instructions that, when executed by the at least one processor, cause the apparatus 1300 to carry out some of the exemplary embodiments described above. Such instructions may, for example, include a computer program code (software) 1322 wherein the at least one memory and the computer program code (software) 1322 are configured, with the at least one processor, to cause the apparatus 1300 to carry out some of the exemplary embodiments described above. Herein computer program code may in turn refer to instructions that cause the apparatus 1300 to perform some of the exemplary embodiments described above. That is, the at least one processor and the at least one memory 1320 storing the instructions may cause said performance of the apparatus.

The processor is coupled to the memory 1320. The processor is configured to read and write data to and from the memory 1320. The memory 1320 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage. In general, memories may be referred to as non-transitory computer readable media. The memory 1320 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

The memory 1320 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1300 may further comprise a communication and sensing interface 1330 comprising hardware and/or software for realizing communication connectivity according to one or more communication protocols, as well as radar sensing capability. The communication and sensing interface 1330 comprises at least one transmitter (Tx) and at least one receiver (Rx) that may be integrated to the apparatus 1300 or that the apparatus 1300 may be connected to. The communication and sensing interface 1330 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication and sensing interface 1330 provides the apparatus with radar sensing and radio communication capabilities to communicate in the cellular communication system. The communication and sensing interface may, for example, provide a radio interface to one or more terminal devices. The apparatus 1300 may further comprise another interface towards a core network such as the network coordinator apparatus and/or to the access nodes of the cellular communication system.

The apparatus 1300 may further comprise a scheduler 1340 that is configured to allocate radio resources. The scheduler 1340 may be configured along with the communication control circuitry 1310 or it may be separately configured.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus, comprising:
at least one processor; and
at least one memory storing instructions that, when executed with the at least one processor, cause the apparatus to:
determine, with a transmit and receive beam pair of a plurality of beam pairs, a transmit power value based at least partly on a saturation power value of one or more analog-to-digital converters at a receiver, wherein the apparatus comprises the receiver and a transmitter; and
transmit, with the transmitter, a signal using the determined transmit power value and a corresponding transmit beam with the transmit and receive beam pair of the plurality of beam pairs.

2. The apparatus according to claim 1, wherein the instructions, when executed with the at least one processor, cause the apparatus to:
select an initial transmit power value between a lower threshold and a higher threshold;
transmit, with the transmitter, a signal using the initial transmit power value and a transmit beam with the transmit and receive beam pair of the plurality of beam pairs; and
measure, using a receive beam with the transmit and receive beam pair of the plurality of beam pairs, a received power value of a reflected, scattered, or diffracted signal of the signal transmitted using the initial transmit power value,
wherein the transmit power value is determined based least partly on the received power value.

3. The apparatus according to claim 2, wherein the instructions, when executed with the at least one processor, cause the apparatus to:
determine, with the transmit and receive beam pair of the plurality of beam pairs, a difference between the saturation power value and the received power value,
wherein the transmit power value is determined based at least partly on the difference.

4. The apparatus according to claim 1, wherein the transmit power value is determined based at least partly on the saturation power value, a beamforming power gain with the transmit and receive beam pair, and a power isolation coefficient between the transmitter and the receiver.

5. The apparatus according to claim 1, wherein the transmit power value is determined with:
transmitting, with the transmitter, a signal with using an initial transmit power value and a transmit beam with the transmit and receive beam pair of the plurality of beam pairs; and
iteratively reducing the initial transmit power value until the saturation power value of the one or more analog-to-digital converters is not exceeded.

6. The apparatus according to claim 5, wherein the initial transmit power value corresponds to a maximum available transmit power.

7. The apparatus according to claim 1, wherein the transmitter and the receiver are spatially separated.

8. The apparatus according to claim 1, wherein the instructions, when executed with the at least one processor, cause the apparatus to:
determine, with a beam of a plurality of beams, a minimum power at the receiver based at least partly on an effective noise power of the receiver and a signal-to-noise ratio threshold for communication;
determine, with the beam of the plurality of beams, a maximum supported path-loss based at least partly on the minimum power at the receiver and the determined transmit power value; and
determine, with the beam of the plurality of beams, a maximum supported distance for communication based at least partly on the maximum supported path-loss and a wavelength.

9. The apparatus according to claim 1, wherein the instructions, when executed with the at least one processor, cause the apparatus to:
determine, with the transmit and receive beam pair of the plurality of beam pairs, a minimum power at the receiver based at least partly on an effective noise power of the receiver, a signal-to-noise ratio threshold for sensing, and a quantization noise power;
determine, with the transmit and receive beam pair of the plurality of beam pairs, an effective path-loss based at least partly on the minimum power at the receiver and the determined transmit power value; and
determine, with the transmit and receive beam pair of the plurality of beam pairs, a maximum supported distance for sensing based at least partly on the effective path-loss and a wavelength.

10. The apparatus according to claim 1, wherein the instructions, when executed with the at least one processor, cause the apparatus to:
receive, with the receiver, a reflected, scattered, or diffracted signal of the signal transmitted using the determined transmit power value, wherein the reflected, scattered, or diffracted signal is received using a receive beam with the transmit and receive beam pair of the plurality of beam pairs; and determine, based at least partly on the reflected, scattered, or diffracted signal of the signal transmitted using the determined transmit power value, at least one of: a distance, a direction, a velocity or a size of a target object, wherein the reflected, scattered, or diffracted signal is reflected, scattered, or diffracted from the target object.

11. The apparatus according to claim 1, wherein the signal is transmitted using multiple transmit beams simultaneously.

12. The apparatus according to claim 1, wherein the apparatus comprises a terminal device or an access point of a wireless communication network.

13. The apparatus according to claim 1, wherein the apparatus is capable of joint communication and sensing.

14. A method performed by an apparatus, the method comprising:

determining, with a transmit and receive beam pair of a plurality of beam pairs, a transmit power value based at least partly on a saturation power value of one or more analog-to-digital converters at a receiver, wherein the apparatus comprises the receiver and a transmitter; and transmitting, with the transmitter, a signal using the determined transmit power value and a corresponding transmit beam with the transmit and receive beam pair of the plurality of beam pairs.

15. A non-transitory program storage device readable with an apparatus, tangibly embodying a program of instructions executable with the apparatus for causing the apparatus to perform operations, the operations comprising:

determining, with a transmit and receive beam pair of a plurality of beam pairs, a transmit power value based at least partly on a saturation power value of one or more analog-to-digital converters at a receiver, wherein the apparatus comprises the receiver and a transmitter; and transmitting, with the transmitter, a signal using the determined transmit power value and a corresponding transmit beam with the transmit and receive beam pair of the plurality of beam pairs.

16. The apparatus according to claim 1, wherein the transmitter causes self-interference in the apparatus at least at the one or more analog-to-digital converters at the receiver.

17. The apparatus according to claim 1, wherein:

at least some different transmit and receive beam pairs create different self-interference power levels; and the transmit power value determined for at least one transmit and receive beam pair is different from another of the transmit and receive beam pairs in the plurality of beam pairs.

18. The method according to claim 14, wherein determining the transmit power value comprises:

transmitting, with the transmitter, a signal with using an initial transmit power value and a transmit beam with the transmit and receive beam pair of the plurality of beam pairs; and iteratively reducing the initial transmit power value until the saturation power value of the one or more analog-to-digital converters is not exceeded.

19. The method according to claim 14, further comprising:

determining, with a beam of a plurality of beams, a minimum power at the receiver based at least partly on an effective noise power of the receiver and a signal-to-noise ratio threshold for communication;

determining, with the beam of the plurality of beams, a maximum supported path-loss based at least partly on the minimum power at the receiver and the determined transmit power value; and determining, with the beam of the plurality of beams, a maximum supported distance for communication based at least partly on the maximum supported path-loss and a wavelength.

20. The method according to claim 14, further comprising:

receiving, with the receiver, a reflected, scattered, or diffracted signal of the signal transmitted using the determined transmit power value, wherein the reflected, scattered, or diffracted signal is received using a receive beam with the transmit and receive beam pair of the plurality of beam pairs; and determining, based at least partly on the reflected, scattered, or diffracted signal of the signal transmitted using the determined transmit power value, at least one of: a distance, a direction, a velocity or a size of a target object, wherein the reflected, scattered, or diffracted signal is reflected, scattered, or diffracted from the target object.

* * * * *